United States Patent [19]

Sato et al.

[11] 3,900,454

[45] Aug. 19, 1975

[54] METHOD FOR POLYMERIZING MONOMERS COMPRISING ALPHA-OLEFIN

[75] Inventors: Akihiro Sato; Saburo Takeda; Shiro Konotsune; Mitsuru Kato; Takao Tonoike, all of Yokohama, Japan

[73] Assignee: Chisso Corporation, Osaka, Japan

[22] Filed: Nov. 9, 1972

[21] Appl. No.: 305,045

Related U.S. Application Data

[63] Continuation-in-part of Ser. No. 23,484, March 7, 1970, abandoned, which is a continuation-in-part of Ser. No. 794,421, Jan. 27, 1969, abandoned.

[30] Foreign Application Priority Data

Feb. 3, 1968 Japan.................................. 43-6546
July 9, 1968 Japan................................ 43-47974

[52] U.S. Cl......... 260/88.2 R; 252/429 C; 260/93.7; 260/94.9 DA; 260/94.9 E
[51] Int. Cl........................... C08f 1/56; B01j 11/84
[58] Field of Search........... 260/88.2, 93.7, 94.9 DA

[56] References Cited
UNITED STATES PATENTS

| | | | |
|---|---|---|---|
| 3,526,616 | 9/1970 | Dilbonille et al. .......... | 260/94.9 DA |
| 3,676,414 | 7/1972 | Diedrich et al. ............. | 260/94.9 DA |
| 3,676,415 | 7/1972 | Diedrich et al. ............. | 260/94.9 DA |
| 3,759,884 | 9/1973 | Tokugumi et al........... | 260/94.9 DA |

FOREIGN PATENTS OR APPLICATIONS

| | | |
|---|---|---|
| 1,208,242 | 10/1970 | United Kingdom |
| 1,560,467 | 2/1969 | France |

*Primary Examiner*—Edward J. Smith
*Attorney, Agent, or Firm*—Fred Philpitt

[57] ABSTRACT

Method for polymerizing an alpha-olefin or copolymerizing an alpha-olefin with another olefin in the presence of a catalyst obtained by subjecting to a first reaction, a halogenide of trivalent metal together with at least one kind of compound selected from the group consisting of halogenide hydrates, sulfide hydrates, sulfate hydrates, hydroxides and hydroxide hydrates of metals belonging to the I–VIII groups of the periodical table so as to form active groups on the surface, then reacting the resultant first reaction product with a transition metal compound and further combining the resultant second reaction product thus obtained with an organoaluminum compound.

The above-mentioned second reaction is preferably carried out in the presence of an aromatic solvent. As the above-mentioned compounds of metals of the I–VIII groups, the hydroxides of the II group, particularly magnesium hydroxide and calcium hydroxide, are preferably selected. In this case, the above-mentioned first and second reactions are both carried out at a temperature of 110°C or below.

The above-mentioned polymerization or copolymerization in the presence of the above-mentioned catalyst is preferably carried out in the presence of a titanium alkoxide and hydrogen in an amount more than 10% and less than 80% by volume based upon the total amount of ethylene and hydrogen.

7 Claims, No Drawings

METHOD FOR POLYMERIZING MONOMERS COMPRISING ALPHA-OLEFIN

RELATED APPLICATIONS

This application is a continuation-in-part of Ser. No. 23,484, filed March 7, 1970 (and now abandoned) which in turn was a continuation-in-part of Ser. No. 794,421, filed Jan. 27, 1969, (and now abandoned).

This invention relates to a polymerization and copolymerization method for alpha-olefins. More particularly, it relates to a method for polymerizing or copolymerizing and alpha-olefin in the presence of a catslyst obtained by reacting a first reaction product having reactive groups on its surface with a transition metal compound and combining the resultant second reaction product with an organoaluminum compound.

Methods for polymerizing an alpha-olefin in the presence of a transition metal compound and an organoaluminum compound are well known. However, since the transition metal compound becomes a solid agglomerate in the reaction with the organoaluminum compound even when it is used in liquid state, the utilization efficiency as a polymerization catalyst is generally reduced remarkably.

Attempts to support a transition metal compound on a carrier so as to minimize such a defect have been proposed (see for example, U.S. Pat. No. 3,255,167, Japanese Pat. Publication Nos. 20772/1967, 20773/1967, 20774/1967, French Pat. Nos. 1,375,127, 1,381,947, 1,466,376 and German Pat. No. 1,244,731, etc.) but the utilization efficiency of the transition metal compound can not be said to be sufficient in these methods.

An object of the present invention is to provide a method for polymerizing an alpha-olefin in which the utilization efficiency of transition metal is exceedingly high. Another object of the present invention is to provide a method for polymerizing an alpha-olefin in which the reducing effect of molecular weight of poly-alpha-olefin by the use of hydrogen is remarkable. A further object of the present invention is to provide a method which is not accompanied by a drawback such as the formation of a polymer film upon the wall of polymerization vessel, which is usually encountered in case of polymerization in the presence of a liquid transition metal compound, e.g. titanium tetrachloride and an organoaluminum compound.

A furthermore object of the present invention is to provide a method for producing a polymer having a high bulk density and no coloring, without accompaniment of any corrosion of equipment and which permits easy removal of catalyst after polymerization.

A still further object of the present invention is to provide a method for obtaining a polymer having a high bulk density and an improved resistance to stress-cracking.

Other objects of the present invention will become apparent from the description hereinafter described.

These objects can be attained by the method and the catalyst of the present invention.

The method of the present invention consists in polymerizing an alpha-olefin in the presence of a catalyst prepared by subjecting to a first reaction, at a temperature ranging from 60° to 200°C., a halogenide of a trivalent metal together with at least one kind of compound selected from the group consisting of halogenide hydrates, sulfide hydrates, sulfate hydrates, hydroxides and hydroxide hydrates of a metal belonging to the I – VIII groups of the periodic table so as to form active groups on the surface, then reacting the resultant first products with a transition metal compound and further combining the resultant second reaction product with an organoaluminum compound.

As the first component for the first reaction used in the present invention, a halogenide of trivalent metal, e.g. $AlCl_3$, $FeCl_3$, etc. are illustrated, and the anhydrates thereof are preferable.

Further as the second component to be used in combination with the above-mentioned halogenide of trivalent metal in the production of the first reaction product, e.g. $Na_2S.9H_2O$, $LiOH.H_2O$, $Mg(OH)_2$, $Zn(OH)_2$, $Ca(OH)_2$, $MgCl_2.6H_2O$, $SnCl_2.2H_2O$, $TiCl_3.6H_2O$, $MnCl_2.4H_2O$, $FeCl_2.2H_2O$, $CoCl_2.6H_2O$, $NiCl_2.6H_2O$, $Cr(OH)_3$, $Mn(OH)_2$, $Fe(OH)_3$, $Co(OH)_3$, $Ni(OH)_2.H_2O$, $VOSO_4.2H_2O$, $CoSO_4.7H_2O$, $FeSO_4.7H_2O$, etc. are illustrated.

Both the components to be used in the first reaction are mixed adequately and then reacted.

There is no particular limitation as to the mixing proportion but about 0.01 – 10 mols and preferably about 0.1 – 2.0 mols of the second component will be generally sufficient per one mol of halogenide of trivalent metal.

As the first reaction condition, a range which produces active hydroxy groups on the surface of the product after the reaction should be selected. Accordingly, a temperature higher than 500°C is not suitable.

The reaction of the both components is generally carried out by maintaining the mixture of the both components at a temperature lower than 250°C, usually at 60° to 200°C and preferably 60° to 110°C under the atmospheric pressure. The reaction time of the first reaction has no particular limitation, but usually a period between 20 minutes and several hours is suitable.

The reaction under a reduced pressure is advantageous because a relatively low temperature can be used for a relatively short time.

The first reaction product contains active OH groups on its surface and the presence of such OH groups is considered to make the reaction product useful for attaining the objects of the present invention.

Judging from the identification by way of X-ray diffraction and thermal analysis, the above-mentioned product is different from the material in which each of the substituents of the metals of the components for forming the first reaction product is simply exchanged in course of the first reaction. It is evident that the properties of the product are complicated and it is not a compound having such a simple constitution as e.g. Mg(OH)Cl produced by burning of magnesium chloride hexahydrate.

A transition metal compound is then reacted with the above-mentioned first product. This second reaction is carried out under mild conditions by mixing and heating the first reaction product and the transition metal compound in the presence of an inert solvent. The reaction temperature is usually in the range of room temperature to about 250°C, and preferably room temperature to 110°C.

When an aromatic hydrocarbon is employed as an inert solvent, a better result can be obtained.

As an example the first reduction product may be suspended in the inert solvent, and to the resultant suspension the transition metal compound may be added. Alternatively, the transition metal compound may be first mixed with the solvent, and then the first reaction product may be added to the mixture. The second reaction product in the inert solvent may be filtered off, or may be subjected to the subsequent procedure in a slurry form without filtration.

As still another example of the preparation of the second reaction product, the first reaction product on heating may be treated with the vapor of the transition metal. In this case, it is advantageous to pretreat the first reaction product with the vapor of an aromatic hydrocarbon prior to the reaction with the vapor of the transition metal.

Examples of the inert solvent to be employed in the above-mentioned preparation of the second reaction product include normal hexane, heptane, octane, nonane, decane, cyclohexane, cyclopentane, or the like. And examples of the aromatic hydrocarbon include benzene, naphthalene, and derivatives thereof, for example, alkyl substitutes such as toluene, xylene, mesitylene, and durene; those having multi-nuclear aromatic rings; amine derivatives having no active hydrogen; aniline derivatives having no active hydrogen such as dimethylaniline; nitro- and nitroso- derivatives such as nitrobenzene; halides such as chlorobenzene and o-chlorotoluene; alkoxide derivatives such as anisole; and phenoles. These hydrocarbons and their derivatives can be employed solely or as a solvent mixture with a saturated aliphatic hydrocarbon such as normal hexane, heptane, octane or the like.

Besides the above-mentioned methods for the preparation of the second reaction product, it may be possible that the first reaction product and a transition metal compound may be merely mixed and heated.

In a word, the second reaction may be carried out by any of the well known methods except that the temperature condition should be controlled according to this invention, or that the second reaction is carried out in the presence of an aromatic hydrocarbon in addition to the control of the temperature condition.

One gram of the second reaction product obtained according to this invention contains a transition metal in the range of about 1 to 100 mg., although the amount of the metal varies depending upon the reaction condition.

The transition metal compound, includes halides, oxyhalides, alcoholates, alkoxyhalides, acetoxyhalides, acetylacetonates, tetraalkoxides, etc., of titanium, vanadium and chrominum, etc. As preferable transition metal compounds, titanium tetrachloride, vanadium tetrachloride, vanadium oxytrichloride, chromylchloride, titanium tetra-normal-butoxide, etc., can be illustrated.

The second reaction product obtained according to the present invention is used in the polymerization of alpha-olefin in the combination with an organoaluminum compound as in the case of common Ziegler catalyst.

As the organoaluminum compounds, trialkylaluminum such as trimethylaluminum and triethylaluminum, alkylaluminum susquihalides such as ethylaluminum sesquichloride, dialkylaluminum monohalide such as diethylaluminum monochloride, monoalkylaluminum dihalide such as monoethylaluminum dichloride, and the like are illustrated.

The catalyst of the present invention effects the catalytic reaction efficiently both in the homopolymerization and copolymerization of alpha-olefin.

The alpha-olefin broadly includes compounds known as alpha-olefin, namely, monolefins having a straight chain such as ethylene, propylene, butene-1, hexene-1, octene-1, decene-1; monoolefins having branched chain such as 3-methyl-1-butene, 3-methyl-1-pentene, 4-methyl-1-pentene, 5-methyl-1-hexene and others.

The polymerization reaction is commonly carried out in an inert hydrocarbon solvent. There is no limitation in the polymerization temperature and pressure so long as they are in the ranges generally adopted in the polymerization using a Ziegler catalyst. For example, preferable result is obtained when it is carried out at a temperature from about $-50°C$ to about $150°C$ and at a pressure from the atmospheric pressure to 40 kg/cm$^2$.

The addition of such a substance as titanium tetraalkoxide, silicone oil, diester of polyethylene glycol, tetraalkoxysilane, etc., to the polymerization system during the course of polymerization prevents polymer particles from agglomerating and gives a polymer of uniform particles. It is possible to control the density of produced polymers by adjusting the amount of addition of the above-mentioned substance.

By adding a suitable amount of hydrogen in the polymerization system, it is possible to control the molecular weight of produced polymers extremely well. This is one of the advantages of the method of the present invention.

Another advantage of the method of the present invention is, as evident from the formation velocity per g per hour of used transition metal ranging from $1 \times 10^3$ to $5 \times 10^5$ g polymer / g Ti / hr., the high utilization efficiency of transition metal compound.

The above-mentioned invention is further illustrated in Examples 1 to 31.

When a hydroxide of a metal of the II group of the periodic table as the second component of the first reaction is mixed with a trivalent metal halide, and is heated, the reaction gradually begins to proceed in the temperature range of about $50° - 60°C$, and when the temperature exceeds $110°C$, a remarkable exothermic reaction takes place followed by dehydrohalogenation. Therefore, in the first reaction using a hydroxide of a II group metal, the temperature of $110°C$ or below is much preferable.

As the hydroxide of a II group metal to be used in the preparation of the first reaction product, magnesium hydroxide, calcium hydroxide and the like are illustrated.

When the second reaction of the just above-mentioned first reaction product with a transition metal compound in the presence of an aromatic hydrocarbon and/or a derivative thereof is carried out at a temperature of $110°C$ or below, and then the polymerization is carried out in the presence of a catalyst prepared by combining the resultant second reaction product with an organoaluminum compound, there are many advantages as described hereinafter in addition to the aforementioned, particularly in the polymerization of ethylene, and also in the copolymerization of ethylene with another olefin such as propylene, butene-1, 3-methylpentene-1, 4-methyl-pentene-1, hexene-1, heptene-1 and styrene.

Examples of aromatic hydrocarbons and/or derivatives thereof, transition metal compounds, organoaluminum compounds, the preparation of the catalyst, etc., are illustrated similarly to the above-mentioned.

An advantage obtained according to this improved method, is that the bulk density of the resultant polymer generally reaches an extremely improved level of 0.21 to 0.34, compared with the general range of 0.11 to 0.22 obtained by the aforementioned method.

Further, the post-treatments after the polymerization such as the deactivation of the catalyst, washing and the like, are easy, and the removal of the catalyst can be carried out conveniently, and hence a white polymer without any coloring can be obtained.

Furthermore, in the preparation of the catalyst, since both the first and second reactions are carried out at a relatively low temperature of 110°C or below, the reaction can be carried out with a good reproducibility under mild conditions and with a small-scale heating equipment.

Moreover, since few dehydrohalogenation occurs in the first reaction, the corrosion of equipment can be avoided.

This improved method has also other advantages similar to the aforementioned method such as a high available efficiency of the transition metal compound and a high polymerization activity in the catalyst; no adhesion of the polymer in a film state on the surface of stirrer and on the wall of the reaction vessel during the polymerization reaction in the practice of the present invention; and an easy control of the molecular weight by means of hydrogen.

This improved method is further illustrated in Examples 32 – 41.

When the polymerization of ethylene or the copolymerization of ethylene with another olefin in the presence of any of the firstly aforementioned catalyst system and the second mentioned catalyst system is carried out in the presence of a titanium alkoxide and hydrogen in a specified amount in the polymerization system, excellent advantage can be obtained in addition to the aforementioned advantages.

The amount of titanium alkoxide to be added to the polymerization system is generally in the range of 0.01 to 20.0 millimoles per gram of the second reaction product, and preferably in the range of 0.05 to 10.0 millimoles.

The effectiveness of this further improved method can not be achieved suitably if the amount of the alkoxide is below the above range, and if the amount of the alkoxide exceeds the above range, the formation of low molecular weight polymers is undesirably increased.

A suitable titanium alkoxide is, for example, titanium tetra-alkoxide, more concretely, titanium tetranormal-butoxide, titanium tetra-ethoxide, titanium tetramethoxide, or the like.

The hydrogen amount to be added to the polymerization system, together with titanium alkoxide, should be in the range of more than 10% to less than 80% by volume, based on the total amount of ethylene and hydrogen.

If the hydrogen amount is less than the above range, the polymer aggregates and does not form uniform particles. Furthermore, due to a small bulk density, the resulting polymer shows a phenomenon such as jumping out of the polymerization solvent, so that a polymer having uniform and good physical properties can not be obtained.

On the other hand, if the hydrogen amount exceeds the above range, such drawbacks are brought about that the molecular weight of the polymer is too much decreased, the polymerization activity is lowered and the bulk density becomes smaller.

According to this further improved method, the bulk density of the resultant polymer formed generally reaches an improved level of 0.24 to 0.42, compared with the general range of 0.11 to 0.22 obtained by the aforementioned method.

When a polymer having such an improved bulk density is formed, the slurry in the reaction vessel is in a good state, and the content of the solvent in the resultant wet cake becomes smaller. Thus, a small heat quantity may be sufficient for the drying and the loss of solvent becomes very small. These facts are very advantageous from a commercial view point.

This further improved method has another advantage in that the polymer thus obtained requires a smaller area, the capacity of pelletizer is remarkably increased and hence the productivity is increased.

Still another advantage is that a good dispersion of the catalyst, in connection with the increase of the bulk density, prevents the polymer particles from aggregating and enables to obtain the polymer to be obtained in uniform and fine particles.

In addition, a polymerization procedure such as agitation becomes easy, and the polymer does not adhere onto the surface of the agitator or on the wall of the reaction vessel in film state.

Further, since this improved method is useful for remarkably increasing the polymerization activity of the catalyst, the yield of polymer per unit amount of catalyst also increases, and besides, the after-treatment to be carried out after the polymerization reaction, such as deactivation, washing and drying of the catalyst, can be readily and suitably conducted.

A further advantage of this improved method is that the control of the molecular weight of polymer can be readily and effectively carried out by controlling the amounts of the titanium alkoxide and hydrogen to be added to the reaction system.

According to this improved method, therefore, the same molecular weight polymer as that of the aforementioned method can be prepared at a lower pressure and in a smaller equipment.

The process of this improved methos is also useful in enhancing the stress cracking-resistance properties of the resultant polymer.

This further improved method is illustrated in examples 42 – 56. In the examples, the value of yellowness was obtained according to ASTM D1925-63T, and the proportion of hydrogen expressed in % by volume was based on the total amount of ethylene to be polymerized and hydrogen.

EXAMPLE 1 a. Preparation of a first reaction product.

5.8g of magnesium hydroxide (the mineral name: brucite) and 13.3g of anhydrous aluminum chloride were mixed, milled and heated to 170°C under the reduced pressure of 1 mmHg in a 300 ml flask. At the same time with heating, aluminum chloride sublimated to vapor and reacted with magnesium hydroxide accompanying a violent dehydrochlorination. The pressure within the flask was elevated, and after returning the pressure to atmospheric, further reaction was carried out at 181°C for 25 hours. The resultant product was cooled and finely milled, and then heated to 181°C for 16 hours in the atmosphere of nitrogen to obtain a first reaction product.

b. Reaction of titanium tetrachloride with the first reaction product.

12.4g of the first reaction product obtained in (a) was suspended in 15 ml of xylene, and 11.7g of titanium tetrachloride was added thereto. The mixture was heated at 120°C for 30 minutes to carry out a reaction between active groups in the first reaction, that is, hydroxyl groups and titanium tetrachloride.

After completion of the reaction, the product thus obtained was cooled in the atmosphere of nitrogen, filtered in a glove box the atmosphere of which has been replaced by nitrogen, washed with n-hexane and dried to obtain a second reaction product (I).

The second reaction product (I) contains 1 mg of titanium metal per 1g.

c. Polymerization of ethylene by the use of the solid product (I).

Into a 300 ml pressure glass reaction tube provided with a stirrer, after flushing with nitrogen gas, were introduced 150 ml of n-hexane, 181.1 mg of the above-mentioned second reaction product (I) and 52.4 mg of triethylaluminum. The reaction tube was sealed and stirring was carried out at 70°C for 20 minutes. Ethylene was then introduced under a pressure, and polymerization reaction was conducted at 70°C for 15 minutes while maintaining a gauge pressure of 10 kg/cm$^2$. The polymer thus obtained was fine powders and there was observed no formation of the polymer film on the wall of the polymerization tube.

After completion of the reaction, the catalyst was deactivated in accordance with a usual procedure, followed by washing, filtering and drying, whereby 20.3g of white powders was obtained. The yield of the polymer per gram of the second reaction product (I) was 448 g/g/hr., and that per gram of the transition metal was $4.48 \times 10^5$ g/g/hr. because one gram of the second reaction product (I) contained 1 mg of titanium. This shows that the efficiency of titanium is very high.

EXAMPLE 2

When 5.1g of $Na_2S.9H_2O$ was mixed with 11.2g of aluminum chloride at room temperature markedly exothermic reaction accompanying dehydrochlorination occurred. The mixture was further heated to 120°C for 48 hours, and then cooled and finely milled to obtain a first reaction product.

8.1g of the product, 15 ml of xylene and 8.6g of titanium tetrachloride were mixed and heated at 130°C for one hour, followed by cooling, filtering and washing. Thus, there was obtained a second reaction product (II), the titanium content of which was 95 mg/g.

Polymerization of ethylene was carried out by the use of the second reaction product (II) according to the procedure in Example 1. The results are shown in Table 1.

EXAMPLE 3

10.4g of $MgCl_2.6H_2O$ and 27.2g of aluminum chloride were mixed, milled and heated at 180°C for 25 hours. The mixture was then finely milled and heated at 180°C for 16 hours in a current of nitrogen to obtain a first reaction product. 7.9g of the product, 15 ml of xylene and 10.4g of titanium tetrachloride were mixed and the reaction was carried out at 120°C for 30 minutes, followed by cooling in a current of nitrogen, filtering, washing and drying to obtain a second reaction product (III), the titanium content of which was 12 mg/g. Polymerization of ethylene was carried out using the second reaction product (III) according to the procedure of Example 1. The results are shown in Table 1.

EXAMPLE 4

7.8g of aluminum hydroxide (the mineral name: gibbsite) and 27.2g of aluminum chloride were mixed and heated at 181°C for 27 hours. The mixture was finely milled and further heated for 23 hours in the current of nitrogen to obtain a first reaction product. 7.7g of the product, 15 ml of xylene and 10.4g of titanium tetrachloride were mixed and heated at 120°C for 30 minutes, followed by cooling, filtering, washing and trying to obtain a second reaction product (IV), the titanium content of which was 1 mg/g. Polymerization of ethylene was carried out using the second reaction product (IV) according to the procedure of example 1. The results are shown in Table 1.

EXAMPLE 5

Polymerization of ethylene was carried out using the second reaction product (I) prepared in Example 1 and diethylaluminum chloride ($AlEt_2Cl$) as an organoaluminum compound, according to the procedure of Example 1. The results are shown in Table 1.

EXAMPLE 6

Polymerization of ethylene was carried out using the second reaction product (I) prepared in Example 1 and monoethylaluminum dichloride as an organoaluminum compound according to the procedure of Example 1. The results are shown in Table 1.

Table 1

| | Example | 1 | 2 | 3 | 4 | 5 | 6 |
|---|---|---|---|---|---|---|---|
| Catalysts | Kind of first reaction Product | $Mg(OH)_2$—$AlCl_3$ | $Na_2S\cdot9H_2O$—$AlCl_3$ | $MgCl_2\cdot6H_2O$—$AlCl_3$ | $Al(OH)_3$—$AlCl_3$ | $Mg(OH)_2$—$AlCl_3$ | $Mg(OH)_2$—$AlCl_3$ |
| | Titanium content | 1* | 95 | 12 | 1 | 1 | 1 |
| | Used amount of solid product | 181.1 mg | 138 | 205 | 244 | 153 | 171 |
| | Kind of organoaluminum compound | $AlEt_3$ | $AlEt_3$ | | | | |
| | Used amount of organoaluminum compound | 52.4 mg | 91.2 | | | | |
| | Mol ratio of Al/Ti | 120 | 3.0 | | | | |
| Aging conditions of catalysts | Aging temperature | 70°C | — | | | | |
| | Aging time | 20 min. | 0 | | | | |
| Polymerization condition | Polymerization temperature | 70°C | 70 | | | | |
| | Polymerization time | 15 min. | 60 | | | | |
| Results | Yield | 20.3 g | 16.5 | | | | |
| | Rate of polymerization | 448** | 120 | | | | |
| | Rate of polymerization | $4.48 \times 10^5$*** | $1.26 \times 10^3$ | | | | |
| | Viscosity $[\eta]$ in tetralin at 130°C | 11.67 | 12.48 | | | | |
| | B D**** | 0.137 | 0.213 | | | | |

Table 1-Continued

|  | Example | | 1 | 2 |
|---|---|---|---|---|
|  |  |  | AlEt$_2$Cl | AlEtCl$_2$ |
| AlEt$_3$ | AlEt$_3$ |  | 45.4 | 87.6 |
| 78.6 | 78.6 |  | 117 | 191 |
| 13 | 135 |  | 70 | 70 |
| 70 | 70 |  | 30 | 28 |
| 25 | 10 |  | 70 | 70 |
| 70 | 70 |  | 60 | 60 |
| 60 | 40 |  | 10.5 | 0.2 |
| 10.8 | 8.6 |  | 68.6 | 1.2 |
| 52.7 | 49.2 |  | 6.86 × 10$^4$ | 2.0 × 10$^2$ |
| 4.40 × 10$^3$ | 4.92 × 10$^4$ |  | 18.68 | 19.52 |
| 13.21 | 15.80 |  | 0.164 | 0.182 |
| 0.164 | 0.154 |  |  |  |

*Ti mg/second reaction product g.
**Polymer g/second reaction product g/hr.
***Polymer g/Ti g/hr.
****B D : bulk density
Polymerization: n-hexane, 150 ml
Condition: Ethylene gauge pressure 10 kg/cm$^2$

EXAMPLES 7 – 12

In these Examples are shown other embodiments in case of polymerization of α-olefin using the second reaction product (I) obtained in Example 1, and ethylene or propylene was polymerized in 150 ml of n-hexane according to Example 1.

The results are summarized in Table 2.

EXAMPLE 7

This example shows the case of polymerization of propylene using triethylaluminum as organoaluminum compound.

EXAMPLE 8

Ethylene was polymerized with the addition of tetra-n-butoxy titanium [Ti(OBu)$_4$] as an additive to the polymerization system.

EXAMPLE 9

Ethylene was polymerized with the addition of tetra-n-butoxy titanium as an additive to the polymerization system, and under a hydrogen gauge pressure of 1 kg/cm$^2$ and an ethylene gauge pressure of 9 kg/cm$^2$. (Hydrogen content in the total gas: 10%).

EXAMPLE 10

Ethylene was polymerized with the addition of tetra-n-butoxy titanium as an additive to the polymerization system and by the use of diethylaluminum chloride in place of triethylaluminum.

EXAMPLE 11

Ethylene was polymerized with the addition of tetraethoxy silane, [Si(OEt)$_4$] as an additive of the polymerization system and under a hydrogen gauge pressure of 1 kg/cm$^2$ and an ethylene gauge pressure of 6 kg/cm$^2$. (Hydrogen content in the total gas: 14%).

EXAMPLE 12

Ethylene was polymerized with the addition of silicone oil as an additive to the polymerization system and under a hydrogen gauge pressure of 1 kg/cm$^2$ and an ethylene gauge pressure of 9 kg/cm$^2$.

Table 2

|  | Examples | 7 | 8 | 9 | 10 | 11 | 12 |
|---|---|---|---|---|---|---|---|
| Catalyst | Used amount of second reaction product | 215 mg | 179 | 183 | 171 | 177 | 177 |
|  | Kind of organoaluminum compound | AlEt$_3$ | AlEt$_3$ | AlEt$_3$ | AlEt$_2$Cl | AlEt$_3$ | AlEt$_3$ |
|  | Used amount of organoaluminum compound | 54.7 mg | 105 | 69.5 | 72 | 78.8 | 78.8 |
|  | Kind of additive | — | Ti(OBu)$_4$ | Ti(OBu)$_4$ | Ti(OBu)$_4$ | Si(OEt)$_4$ | Silicone oil |
|  | Used amount of additive | 0mmol | 0.061 | 0.057 | 0.056 | 0.053 | 0.086 |
|  | Mol ratio of additive/second reaction product | — | 16 | 15 | 15 | 17 | — |
|  | Mol ratio of Al/Ti | 110 | 14 | 10 | 10 | 215 | 186 |
| Aging condition of catalyst | Aging temperature | 70°C | 70 | 70 | 70 | 70 | 70 |
|  | Aging time | 30 min. | 25 | 22 | 25 | 31 | 20 |
| Polymerization conditions | Monomer | propylene | ethylene |  |  |  |  |
|  | Monomer pressure | 10 kg/cm$^2$ | 10 |  |  |  |  |
|  | Hydrogen gauge pressure | 0 kg/cm$^2$ | 0 |  |  |  |  |
|  | Polymerization temperature | 70°C | 70 |  |  |  |  |
|  | Polymerization time | 60 min. | 25 |  |  |  |  |
| Results | Yield | 2.0 g | 26.2 |  |  |  |  |
|  | Rate of Polymerization | 92* | 352 |  |  |  |  |
|  | Rate of Polymerization | 9.2 × 10$^3$** | 3.5 × 10$^5$ |  |  |  |  |
|  | Viscosity [η] in tetralin at 130°C | 6.54 | 10.85 |  |  |  |  |
|  | B D | 0.152 | 0.147 |  |  |  |  |

Table 2—Continued

| Examples | | 7 | 8 |
|---|---|---|---|
| ethylene | ethylene | ethylene | ethylene |
| 9 | 10 | 6 | 9 |
| 1 | 0 | 1 | 1 |
| 70 | 70 | 70 | 70 |
| 10 | 60 | 60 | 30 |
| 13.3 | 13.9 | 22.3 | 23.4 |
| 436 | 81.3 | 126 | 257 |
| $4.36 \times 10^5$ | $8.13 \times 10^4$ | $1.26 \times 10^5$ | $2.57 \times 10^5$ |
| 3.32 | 18.46 | 4.98 | 5.15 |
| 0.116 | 0.137 | 0.154 | 0.167 |

*Polymer g/second reaction product g/hr.
**Polymer g/Ti g/hr.

EXAMPLE 13

Ethylene and propylene were copolymerized according to the procedure of Example 1.

Firstly, polymerization was carried out by the use of 403.5 mg of the second reaction product (I) obtained in Example 1, 152 mg of triethylaluminum and 150 ml of n-hexane, at 70°C for 30 minutes under a propylene gauge pressure of 10 kg/cm². Unreacted propylene was then purged and the pressure was reduced to normal. Thereafter, ethylene was introduced under a pressure up to a gauge pressure of 10 kg/cm², followed by further polymerization for 12 minutes. Thus, 18.8g of white polymer was obtained by a common aftertreatment. The yield of the polymer was 66.4 g/second reaction product g/hr.

EXAMPLE 14

8.16g of magnesium hydroxide and 18.65g of anhydrous aluminum chloride were mixed, milled and heated at 200°C for 24 hours, followed by cooling and fine milling. Thus, a first reaction product was obtained.

To 9.6g of the above-mentioned product suspended in 15 ml of xylene, was added 5 ml of vanadium oxytrichloride, and the mixture was heated at 120°C for 30 minutes, followed by cooling in a current of nitrogen, filtering, washing and drying. Thus, a second reaction product (V) was obtained, one gram of which contained 92 mg of vanadium.

Polymerization of ethylene was carried out using the second reaction product (V), according to the procedure of Example 1. Namely, it was carried out at 70°C for 60 minutes under an ethylene gauge pressure of 10 kg/cm², by the use of 200 mg of the second reaction product (V) and 125 mg of triethylaluminum (aging time: 5 minutes).

After completion of the polymerization reaction, 37.0g of white polymer was obtained by a common aftertreatment.

The yield was 185 g/second reaction product g/hr., and $2.0 \times 10^3$ g/vanadium g/hr. [$\eta$] in tetralin at 130°C : 45.65 BD : 0.271

EXAMPLE 15

8.4g of the first reaction product obtained in Example 14 was suspended in 15 ml of xylene. 4 ml of titanium tetrachloride was added to the suspension, and reaction at 120°C for 30 minutes, followed by cooling in a current of nitrogen, filtering, washing and drying. Thus, a second reaction product (VI) was obtained, one gram of which contained 6 mg of titanium.

Polymerization of butene-1 was carried out according to the procedure of Example 1. Namely, 201 mg of the above-mentioned second reaction product, 55 mg of triethylaluminum and 150 ml of n-hexane were charged into a 300 ml polymerization tube. 14g of butene-1 was then introduced, and the mixture was warmed up to 70°C. Polymerization was carried out at the same temperature for 2 hours. After completion of the polymerization reaction and subsequent usual after-treatment, 8.9% of white solid polymer was obtained. [$\eta$] in tetralin at 130°C = 4.05. Conversion of the monomer was 63.6%.

EXAMPLE 16 a. Preparation of second reaction product.

5.0g of manganese chloride tetrahydrate ($MnCl_2 \cdot 4H_2O$) and 13.2g of anhydrous aluminum chloride were mixed, milled and subjected to reaction by heating them at 200°C for 24 hours in the current of nitrogen. After completion of the reaction, cooling in the current of nitrogen and fine milling, gave a first reaction product. 2 ml of titanium tetrachloride was added to 6.5g of the first reaction product suspended in 15 ml of xylene, and the mixture was subjected to reaction by heating at 120°C for 30 minutes, followed by cooling in a current of nitrogen, filtering in a glove box the atmosphere of which had been replaced by nitrogen, washing with n-hexane and drying. Thus, a second reaction product (VII) was obtained, one gram of which contained 8 mg of titanium metal.

b. Polymerization of ethylene by the use of the second reaction product (VII).

150 ml of n-hexane, 45.1 mg of the above-mentioned second reaction product (VII) and 32 mg of triethylaluminum were introduced into a 300 ml pressure glass tube provided with a stirrer, the atmosphere of which was replaced by nitrogen. The glass tube was sealed and stirring was conducted at 70°C for 5 minutes, followed by introducing 120 ml of hydrogen. With ethylene being introduced under pressure so as to give 4 kg/cm² (gauge) in total pressure, polymerization reaction was carried out at 70°C for 60 minutes. The polymer thus obtained was fine powders, and no formation of the polymer film on the wall of the polymerization tube was observed.

After completion of the polymerization, the catalyst was deactivated by a common after-treatment, and 12.5g of white powdery polymer was obtained by subsequent washing, filtering and drying.

The yield of the polymer was 277 (polymer) g/second reaction product (VII) g/hr. while $3.5 \times 10^4$ (polymer) g/titanium g/hr. as calculated per titanium atom contained in the second reaction product (VII). Thus, the utilization efficiency of titanium was markedly increased.

The viscosity [η] of the polymer in tetralin at 130°C was 2.85.

EXAMPLE 17

14.3g of $SnCl_2.2H_2O$ and 8.4g of aluminum chloride were mixed, heated at 120°C for 48 hours and finely milled. Thus, a first reaction product was obtained.

16.8g of the first reaction product, 15 ml of xylene and 8.6g of titanium tetrachloride were mixed and subjected to reaction on heating at 130°C for one hour, followed by cooling, filtering, washing and drying. Thus, a second reaction product (VIII) having a titanium content of 46 mg/g was obtained.

Polymerization of ethylene was carried out using the second reaction product (VIII), according to the procedure of Example 16. The results are shown in Table 3.

EXAMPLE 18

5.0g of vanadium (IV) oxysulfate dihydrate ($VOSO_4.2H_2O$) and 6.6g of aluminum chloride were mixed, milled and subjected to reaction on heating at 200°C for 24 hours, followed by cooling and fine milling. Thus, a first reaction product was obtained.

4.2g of the first reaction product, 15 ml of xylene and 2 ml of titanium tetrachloride were mixed and subjected to reaction on heating at 130°C for one hour, followed by cooling in a current of nitrogen, filtering, washing and drying. Thus, a second reaction product (IX) having a titanium content of 12 mg/g was obtained.

Polymerization of ethylene was carried out using the second reaction product (IX), according to the procedure of Example 16. The results are shown in Table 3.

EXAMPLE 19

10.0g of chromium (III) hydroxide ($Cr(OH)_3$) and 13.3g of aluminum chloride were mixed, milled and subjected to reaction on heating at 200°C for 24 hours, followed by cooling and fine milling. Thus, a first reaction product was obtained.

12.5g of the first reaction product, 15 ml of xylene and 2 ml of titanium tetrachloride were mixed and then heated at 130°C for one hour, followed by cooling in a current of nitrogen, filtering, washing and drying. Thus, a second reaction product (X) having a titanium content of 40 mg/g was obtained.

Polymerization of ethylene was carried out using the second reaction product (X), according to the procedure of Example 16. The results are shown in Table 3.

EXAMPLE 20

4.0g of nickel chloride hexahydrate ($NiCl_2.6H_2O$) and 13.3g of aluminum chloride were mixed, milled and subjected to reaction on heating at 200°C for 24 hours, followed by cooling and fine milling. Thus, a first reaction product was obtained.

7.5g of the first reaction product, 15 ml of xylene and 2 ml of titanium tetrachloride were mixed and subjected to reaction on heating at 130°C for one hour, followed by cooling in a current of nitrogen, filtering, washing and drying. Thus, a second reaction product (XI) having a titanium content of 3 mg/g was obtained.

Polymerization of ethylene was carried out using the second reaction product (XI), according to the procedure of Example 16. The results are shown in Table 3.

EXAMPLE 21

10.7g of iron hydroxide ($Fe(OH)_3$) and 13.7g of anhydrous aluminum chloride were mixed, milled and subjected to reaction on heating at 200°C for 48 hours, followed by cooling and fine milling. Thus, a first reaction product was obtained.

11.0g of the first reaction product, 15 ml of xylene and 2 ml of titanium tetrachloride were mixed and subjected to reaction on heating at 130°C for one hour, followed by cooling in a current of nitrogen, filtering, washing and drying. Thus, a second reaction product (XII) having a titanium content of 37 mg/g was obtained.

Polymerization of ethylene was carried out using the second reaction product (XII), according to the procedure of Example 16. The results are shown in Table 3.

Table 3

| | | Examples | 16 | 17 |
|---|---|---|---|---|
| Catalysts | | Kind of first reaction product | $MnCl_2·4H_2O$—$AlCl_3$ | $SnCl_2·2H_2O$—$AlCl_3$ |
| | | Titanium content | 8* | 46 |
| | | Used amount of second reaction product | 45.1 mg | 134 |
| | | Kind of organoaluminum compound | $AlEt_3$ | $AlEt_3$ |
| | | Used amount of organoaluminum compound | 32 mg | 125 |
| Aging conditions of catalysts | | Aging temperature | 70°C | 70 |
| | | Aging time | 5 min. | 60 |
| Polymerization condition | | Polymerization temperature | 70°C | 70 |
| | | Polymerization time | 60 min. | 60 |
| | | Amount of hydrogen | 120 ml | — |
| | | Monomer pressure | 4 kg/cm² | 10 |
| | | Yield | 12.5 g | 9.5 |
| Results | | Rate of polymerization | 277** | 70.9 |
| | | Rate of polymerization | $3.5 \times 10^{4===}$ | $1.54 \times 10^3$ |
| | | Viscosity [η] in tetralin at 130°C | 2.85 | 16.54 |
| | | 18 | 19 | 20 | 21 |
| | | $VOSO_4·2H_2O$—$AlCl_3$ | $Cr(OH)_3$—$AlCl_3$ | $NiCl_2·6H_2O$—$AlCl_3$ | $Fe(OH)_3$—$AlCl_3$ |
| | | 12 | 40 | 3 | 37 |

Table 3 — Continued

| Examples | 16 | 17 |
|---|---|---|
| 75 mg | 92 | 85 |
| | 78 | |
| AlEt$_3$ | AlEt$_3$ | AlEt$_3$ |
| 54 mg | 85 | 46 |
| | 72 | |
| 70°C | 70 | 70 |
| | 70 | |
| 25 min. | 5 | 5 |
| | 5 | |
| 70°C | 70 | 70 |
| | 70 | |
| 60 min. | 60 | 60 |
| | 60 | |
| 250 ml | 250 | 120 |
| | 250 | |
| 7 kg/cm$^2$ | 7 | 4 |
| | 10 | |
| 15.4 g | 10.8 | 8.3 |
| | 6.5 | |
| 205 | 117 | 98 |
| | 83 | |
| 1.7 × 10$^4$ | 2.9 × 10$^3$ | 2.3 × 10$^4$ |
| | 2.3 × 10$^3$ | |
| 3.02 | 2.54 | 2.72 |
| | 3.18 | |

*Ti mg/second reaction product g.
**Polymer g/second reaction product g/hr.
***Polymer g/Ti g/hr.

EXAMPLES 22 – 26

In these Examples are shown other embodiments in case of polymerization of alpha-olefin using the second reaction product (VII) obtained in Example 16, and ethylene or propylene was polymerized in 150 ml of n-hexane according to the procedure of Example 16. The results are summarized in Table 4.

EXAMPLE 22

Ethylene was polymerized using diethylaluminum monochloride as organoaluminum compound.

EXAMPLE 23

Ethylene was polymerized using monoethylaluminum dichloride as organoaluminum compound.

EXAMPLE 24

Propylene was polymerized using triethylaluminum as organoaluminum compound.

EXAMPLE 25

Ethylene was polymerized with addition of tetra-n-butoxy titanium, (Ti(OBu)$_4$) as an additive to the polymerization system.

EXAMPLE 26

Ethylene was polymerized by the use of tetraethoxy silane as an additive to the polymerization system.

Table 4

| | Examples | 22 | 23 | 24 | 25 | 26 |
|---|---|---|---|---|---|---|
| Catalyst | Used amount of second reaction product | 132 mg | 154 | 83 mg | 46 | 46 |
| | Kind of organoaluminum compound | AlEt$_2$Cl | AlEtCl$_2$ | AlEt$_3$ | AlEt$_3$ | AlEt$_3$ |
| | Used amount of organoaluminum compound | 52 mg | 82 | 75 mg | 85 | 85 |
| | Kind of additive | — | — | — | Ti(OBu)$_4$ | Si(OEt)$_4$ |
| | Used amount of additive | - mmol | — | - mmol | 0.050 | 0.040 |
| Aging conditions of catalysts | Aging temperature | 70°C | 70 | 70°C | 70 | 70 |
| | Aging time | 5 min. | 25 | 30 min. | 60 | 60 |
| | Monomer | ethylene | ethylene | propylene | ethylene | ethylene |
| Polymerization conditions | Monomer gauge pressure | 10 kg/cm$^2$ | 10 | 10 kg/cm$^2$ | 5 | 5 |
| | Amount of hydrogen | 250 ml | 120 | - ml | 120 | 250 |
| | Polymerization temperature | 70°C | 70 | 70°C | 70 | 70 |
| | Polymerization time | 60 min. | 60 | 60 min. | 60 | 60 |
| Results | Yield | 8.2 g | 5.4 | 21.8 g | 14.5 | 9.2 |
| | Rate of polymerization | 62* | 35 | 119 | 316 | 200 |
| | Rate of polymerization | 7.8 × 10$^3$** | 4.4 × 10$^3$ | 1.5 × 10$^4$ | 3.9 × 10$^4$ | 2.5 × 10$^4$ |
| | Viscosity [η] in tetralin at 130°C | 5.42 | 9.85 | 2.15 | 2.92 | 3.15 |

*Polymer g/second product g/hr.
**Polymer g/Ti g/hr.

EXAMPLE 27

Ethylene and propylene were copolymerized according to the procedure of Example 16.

Propylene was subjected to polymerization reaction at 70°C under a gauge pressure of 10 kg/cm² for 30 minutes, by the use of 360 mg of the second reaction product (VII) obtained in Example 16, 85 mg of triethylaluminum and 150 ml of n-hexane. Unreacted propylene was then purged and the polymerization system was returned to the normal pressure, followed by charging of 250 ml of hydrogen. Subsequently, ethylene was polymerized under a gauge pressure of 5 kg/cm², for 60 minutes.

After the polymerization, 25.6 g of a white polymer was obtained by the treatment according to the usual procedure.

The production rate of the polymer was 47.3 g/second reaction product (VII) g/hr.

EXAMPLE 28

Polymerization of butene-1 was carried out according to the procedure of Example 16.

180 mg of the second reaction product (VII) obtained in Example 16, 60 mg of triethylaluminum and 150 ml of n-hexane were introduced into 300 ml polymerization tube at room temperature. 18 g of butene-1 was then charged and the mixture was warmed at 70°C, followed by polymerization reaction for 2 hours at the same temperature.

After the polymerization, 11.5 g of a white polymer was obtained by a common after-treatment. [$\eta$] in tetralin at 130°C = 1.84. The conversion of the monomer was 63.9%.

EXAMPLE 29

5.0 g of manganese chloride tetrahydrate (MnCl$_2$·4H$_2$O) and 13.5 g of anhydrous aluminum trichloride were mixed, milled and subjected to reaction on heating at 180°C for 24 hours and in the current of nitrogen. After completion of the reaction, a first reaction product was obtained by cooling in the current of nitrogen and fine milling.

5 ml of vanadium oxytrichloride was added to 7.8 g of the first reaction product suspended in 15 ml of xylene, and the mixture was heated at 120°C for 30 minutes, followed by cooling in the current of nitrogen, filtering, washing and drying. Thus, a second reaction product (XIII) having a vanadium content of 18 mg/g was obtained.

Polymerization of ethylene was carried out using the second reaction product (XIII), according to the procedure of Example 16.

After 154 mg of the second reaction product (XVIII) and 84 mg of triethylaluminum were subjected to aging for 5 minutes, 250 ml of hydrogen was introduced.

Ethylene was subjected to polymerization at 70°C for 60 minutes while maintaining a gauge pressure of 5 kg/cm².

After the polymerization, 18 g of white polymer was obtained by a common after-treatment.

The yield of the polymer was 117 g/second reaction product (XIII) g/hr. while 6.5 × 10³ g/vanadium/g/hr as calculated by vanadium. [$\eta$] in tetralin at 130°C = 3.21.

EXAMPLE 30

58.3 g of magnesium hydroxide and 88.9% of anhydrous aluminum trichloride were mixed, milled and heated at 130°C, for 24 hours in the current of nitrogen. After cooling and fine milling, a first reaction product was obtained.

10 g of the first reaction product, 15 ml of normal heptane and 1 ml of titanium tetra-normal-butoxide were introduced into a 200 ml pear-form-bottom flask. The mixture was then heated at 100°C, for 1 hour, in a current of nitrogen, and filtered in a dry box the atmosphere of which was replaced by nitrogen, washed four times with normal hexane to completely remove unreacted titanium tetra-normal-butoxide, and dried. Thus, there was obtained a second reaction product (XIV) having titanium content of 12 mg/g.

500 ml of normal hexane, 142 mg of the abovementioned product (XIV) and 290 mg of triethylaluminum were introduced into a 1 $^1$ stainless steel reaction tube provided with a stirrer the atmosphere of which was replaced by nitrogen. After the reaction tube was sealed, polymerization reaction was carried out at 80°C, for one hour and at a hydrogen gauge pressure of 1.5 kg/cm² (hydrogen content in the total gas: 33%) and at an ethylene gauge pressure of 3.0 kg/cm². After completion of the reaction, the catalyst was deactivated according to conventional method, followed by washing, filtration and drying. Thus, 85 g of a white powdery polymer was obtained. The yield per gram of the solid product was 600 g/f/hr. [$\eta$] in the tetralin at 130°C = 2.98.

EXAMPLE 31

10 g of the first reaction product prepared similarly to Example 30, 15 ml of normal nonane and 5 ml of titanium tetrachloride were mixed and heated at 140°C, for one hour, in a current of nitrogen, and then cooled, filtered, washed and dried. Thus, there was obtained a second reaction product (XV) having titanium content of 7.8 mg/g.

The polymerization of ethylene was carried out in the manner as described in Example 16, using 80 mg of the above-mentioned product (XV) and 120 mg of trimethylaluminum as catalyst. After 500 ml of hydrogen was introduced into the polymerization system, the polymerization was carried out at 70°C, for one hour, while maintaining an ethylene gauge pressure of 4 kg/cm².

After completion of the polymerization, 24 g of a white polymer was obtained by a conventional after-treatment. The yield of the polymer was 300 gr/product (XV) g/hr, while 3.85 × 10⁵ g/titanium g/hr. [$\eta$] in tetralin at 130°C = 2.15.

EXAMPLE 32 a. Preparation of the catalyst

Magnesium hydroxide (58.3 g) and anhydrous aluminum trichloride (88.9%) were mixed and ground. The mixture was heated under nitrogen stream at 90°C for 24 hrs. After cooling, the mixture was pulverized to obtain the first reaction product. Into a 200 ml pear-shaped flask were placed 10 g of the resultant first reaction product, 5 ml of toluene, and 5 ml of titanium tetrachloride. The mixture was heated at 90°C for 1 hour under nitrogen stream, and then filtered in a glove box flushed by nitrogen, washed four times with 10 ml each of normal hexane to remove thoroughly the unreacted titanium tetrachloride, and dried to obtain the second reaction product (XVI). The second reaction product (XVI) contained 4.6 mg of titanium per gram.

b. Polymerization of ethylene

Into a 1 l stainless steel reaction vessel provided with a stirrer, and flushed with nitrogen gas in advance, were introduced 500 ml of n-hexane, 150.5 mg of the above-described second reaction product, and 400 mg of triethylaluminum. The reaction tube was sealed, and the polymerization reaction was carried out at a temperature of 80°C, a hydrogen gauge pressure of 1.5 kg/cm², and an ethylene gauge pressure of 3.0 kg/cm² for 1 hour. The resultant polymer was in a state of fine powders, and no adhesion of the polymer to the wall of the polymerization vessel was observed.

After the completion of the reaction, the catalyst was deactivated according to the conventional method, and the mixture was washed, filtered, and dried to obtain 25.3 g of white powders. The bulk density of the white powders was as high as 0.323. The yield of the polymer per gram of the second reaction product (XVI) was 168 g/g/hr.

EXAMPLE 33

The procedure of Example 32 was repeated except that 9 ml of xylene and 1 ml of titanium tetrachloride were substituted for 5 ml of toluene and 5 ml of titanium tetrachloride, respectively. The resultant second reaction product (XVII) contained 4.9 mg of titanium per gram of the product.

Table 5 shows the results of the polymerization of ethylene carried out in a similar manner as in Example 32 using the above second reaction product (XVII).

EXAMPLE 34

The procedure of Example 32 was repeated except that 5 ml of anisole was substituted for 5 ml of toluene. The resultant second reaction product (XVIII) contained 54.2 mg of titanium per gram of the product.

The results of the polymerization of ethylene carried out in similar manner as in Example 32 using the reaction product (XVIII) are given in Table 5.

EXAMPLE 35

The procedure of Example 32 was repeated except that 5 ml of dimethylaniline was substituted for 5 ml of toluene. The resultant second reaction product (XIX) contained 21.3 mg of titanium per gram of the product.

The polymerization of ethylene was carried out in a similar manner as in Example 32 using the second reaction product (XIX). The results are given in Table 5.

EXAMPLE 36

The procedure of Example 32 was repeated except that 5 ml of o-chlorotoluene was substituted for 5 ml of toluene. The resulting second reaction product (XX) contained 14.8 mg of titanium atoms per gram of the product.

The polymerization of ethylene was carried out in a similar manner as in Example 32 using the second reaction product (XX). The results are given in Table 5.

Comparative example 1

The procedure of Example 32 was repeated except that 5 ml of normal heptane was substituted for 5 ml of toluene. The resultant second reaction product (XXI) contained 5.0 mg of titanium per gram of the product.

When the polymerization of ethylene was carried out in a similar manner as in Example 32 using the second reaction product (XXI), the resultant polymer had only a bulk density of 0.213 smaller than those obtained in the above examples wherein aromatic hydrocarbon derivatives was used.

The results of Examples 32 - 36 and Comparative example 1 are summarized in Table 5 given below.

Table 5

Effects of the solvents used in the formation of the second reaction product upon the resultant polymers

| Ex. | Solvent | Bulk density | Rate of formation | [η] |
|---|---|---|---|---|
| 32 | toluene | 0.323 | 168 | 1.80 |
| 33 | xylene | 0.323 | 144 | 1.65 |
| 34 | anisole | 0.278 | 178 | 1.58 |
| 35 | dimethylaniline | 0.303 | 195 | 1.75 |
| 36 | o-chlorotoluene | 0.294 | 185 | 1.78 |
| Comparative example | | | | |
| 1 | normal heptane | 0.213 | 165 | 1.70 |

EXAMPLE 37

Magnesium hydroxide (58.3 g) and anhydrous aluminum trichloride (88.9 g) were mixed and ground. The mixture was heated under nitrogen stream at 80°C for 24 hrs. After cooling, the mixture was pulverized to obtain the first reaction product. Then, the mixture of 10 g of the first reaction product, 9 ml of xylene, and 1 ml of titanium tetrachloride was heated at 80°C for one hour, and was treated in a similar manner as in Example 32 to obtain the 2nd reaction product (XXII). This product (XXII) had 1.2 mg of titanium per gram of the product.

The polymerization of ethylene was carried out in a similar manner as in Example 32 using the second reaction product (XXII), and there was obtained a white polymer having a bulk density of 0.334. This polymer had a yellowness of 0.1.

Comparative example 2

The procedure of Example 37 was repeated except that the second reaction was carried out at 130°C. The resulting second reaction product (XXIII) contained 8.7 mg of titanium per gram of the product.

When the polymerization of ethylene was carried out in a similar manner as in Example 32 using the second reaction product (XXIII), the resultant polymer had a bulk density of 0.303. The polymer was remarkably colored, and had a yellowness of 3.

Comparative example 3

The procedure of Example 37 was repeated except that the second reaction was carried out at a temperature of 160°C. The resulting second reaction product (XXIV) contained 22.2 mg of titanium per gram of the product.

When the polymerization of ethylene was carried out in a similar manner as in Example 32 using the second reaction product (XXIV), the resultant polymer had a bulk density of 0.271. The polymer was remarkably colored, compared with that of Comparative example 2, and had a yellowness of 5.

EXAMPLE 38

Magnesium hydroxide (58.3 g) and anhydrous aluminum trichloride (88.9 g) were mixed and ground. The mixture was heated under nitrogen strem at 108°C for one hour. After cooling, the mixture was pulverized to obtain the first reaction product.

Then, 10 g of the first reaction product, 9 ml of xylene, and 1 ml of titanium tetrachloride were heated at 90°C for 1 hour, and was treated in a similar manner as in Example 32 to obtain the second reaction product (XXV) containing titanium in an amount of 7.0 mg/g.

The polymerization of ethylene was carried out in a similar manner as in Example 32 using the second reaction product (XXV), and there was obtained a white polymer having a bulk density of 0.313 and a yellowness of 1.

Comparative example 4

Magnesium hydroxide (58.3 g) and anhydrous aluminum trichloride (88.9 g) were mixed and ground. The mixture was heated under nitrogen stream at 130°C for 24 hrs., and there occurred a remarkable dehydrochlorination. After the reaction the mixture was cooled and pulverized to obtain a first reaction product, 10 g of which was heated, together with 9 ml of xylene and 1 ml of titanium tetrachloride, at 160°C for 1 hour. The mixture was then treated in a similar manner as in Example 32 to obtain the second reaction product (XXVI) containing titanium in an amount of 5.6 mg/g.

The polymerization of ethylene was carried out in a similar manner as in Example 32 using the second reaction product (XXVI). The resultant polymer had a remarkably small bulk density of 0.147.

Comparative example 5

Magnesium hydroxide (58.3 g) and anhydrous aluminum trichloride (88.9 g) were mixed and ground. The mixture was heated under nitrogen stream at 210°C for 24 hrs., and there was accompanied a remarkable dehydrochlorination. After the heating, the mixture was cooled and pulverized to obtain a first reaction product, 10 g of which was then heated, together with 9 ml of xylene and 1 ml of titanium tetrachloride, at 160°C for one hour. The reaction mixture was then treated in a similar manner as in Example 32 to obtain the second reaction product (XXVII) containing titanium in an amount of 4.8 mg/g.

The polymerization of ethylene was carried out in a similar manner as in Example 32, using the second reaction product (XXVII). The resulting polymer had only a bulk density of 0.128.

The results of Examples 37 and 38, and Comparative examples 2 – 5 were summarized in Table 6 given below.

Table 6

Effects of the reaction temperature in the formations of the first and second reaction products upon the resultant polymers

| Ex. | First reaction temperature | Second reaction temperature | Polymer Yellowness | Bulk density | Rate of formation | $[\eta]$ |
|---|---|---|---|---|---|---|
| 37 | 80°C | 80°C | 0.1 | 0.334 | 126 | 1.75 |
| 38 | 108 | 90 | — | 0.313 | 161 | 1.83 |
| Comparative examples | | | | | | |
| 2 | 80 | 130 | 3 | 0.303 | 188 | 1.86 |
| 3 | 80 | 160 | 5 | 0.271 | 166 | 1.85 |
| 4 | 130 | 160 | — | 0.147 | 173 | 1.96 |
| 5 | 210 | 160 | — | 0.128 | 161 | 2.05 |

EXAMPLE 39

Calcium hydroxide (74.1 g) and ferric chloride (anhydrous) (92.0 g) were mixed and ground. The mixture was heated under nitrogen stream at 100°C for 24 hrs. After cooling, the mixture was pulverized to obtain the first reaction product.

Then, the mixture of 10 g of the first reaction product, 9 ml of toluene, and 1 ml of titanium tetrachloride was heated at 100°C for 1 hour, and was treated in a similar manner as in Example 32 to obtain the second reaction product (XXVIII) containing titanium in an amount of 8.6 mg/g.

The polymerization of ethylene was carried out in a similar manner as in Example 32, using the second reaction product (XXVIII), and there was obtained a white polymer having a bulk density of 0.314. Rate of formation = 119 g/g/hr. $[\eta] = 1.65$.

EXAMPLE 40

Ethylene-propylene copolymerization was carried out in a similar manner as in Example 32.

Propylene was first polymerized at a gauge pressure 7 kg/cm² and a temperature of 80°C for 10 minutes using 248 mg of the second reaction product (XVI) obtained in Example 32, 400 mg of triethylaluminum, and 500 ml of n-hexane. After unreacted propylene was purged, ethylene was polymerized at a hydrogen gauge pressure of 1.5 kg/cm² and then at an ethylene gauge pressure of 5 kg/cm² for one hour.

After the completion of polymerization, the reaction mixture was treated by a conventional manner to obtain 28.5 g of a white polymer.

This polymer was identified as a copolymer and had a bulk density of 0.343, a rate of formation of 98.4 g/g/hr., and $[\eta] = 1.67$.

EXAMPLE 41

Magnesium hydroxide (58.3 g) and anhydrous aluminum trichloride (88.9 g) were mixed and ground. The mixture was heated under nitrogen stream at 90°C for 24 hours. After cooling, the mixture was pulverized to obtain the first reaction product.

Into a 260 ml pear-shape-bottom flask were introduced 10 g of the reaction product, 10 ml of xylene, and 1 ml of titanium tetra-normal-butoxide, Ti(OBu)₄. The mixture was then heated at 100°C, for one hour, under nitrogen stream, and was treated by a similar manner as in Example 32 to obtain the second reaction product (XXIX) containing titanium in an amount of 6.7 mg/g.

The polymerization of ethylene was carried out in a similar manner as in Example 32, using the second reaction product (XXIX), and there was obtained a white polymer having a bulk density of 0.380. Rate of formation = 318 g/g/hrs. $[\eta] = 1.41$.

EXAMPLE 42 a. Preparation of the catalyst

Magnesium hydroxide (58.3 g) and aluminum chloride (88.9g) were mixed and ground. The mixture was heated at 150°C for 24 hrs. under nitrogen stream. After cooling, the reaction mixture was pulverized to obtain the first reaction product. Into a 200 ml pear-shaped flask were introduced 20 g of the above first reaction product, 15 ml of xylene, and 4 ml of titanium tetrachloride. The mixture was heated at 120°C for one hour, then cooled and filtered under nitrogen stream, washed four times with n-hexane to remove unreacted titanium tetrachloride, and dried to obtain the second reaction product (XXX).

The second reaction product (XXX) contained titanium atoms in an amount of 4.8 mg/g of the product.

b. Polymerization of ethylene

Into a 1 l stainless steel reaction tube provided with a stirrer, and flushed with nitrogen in advance, were introduced 500 ml of n-hexane, 195 mg of the above second reaction product, 0.112 millimole of titanium tetra-normal-butoxide, and 3.77 millimole of triethyl aluminum. The reaction tube was sealed, and the polymerization reaction was carried out at a temperature of 80°C, a hydrogen gauge pressure of 2 kg/cm$^2$ (hydrogen content in the total gas: 40%), and an ethylene gauge pressure of 5.0 kg/cm$^2$ for one hour. The resulting polymer was fine powder, and adhesion of the polymer to the wall of the polymerization vessel was not observed.

After the completion of the reaction, the catalyst was deactivated according to the conventional method, and the mixture was washed, filtered, and dried to obtain 69.2 g of a white polymer. The white polymer had a bulk density of 0.303.

The yield of the polymer was 355 g/hr. per gram of the second reaction product; the melt index (MI) 2.0; and the degree of branching (number of methyl in side-chain) 5.59 per 1,000 carbon atoms of the polymer.

EXAMPLE 43

The polymerization of ethylene in Example 42 was repeated except that the used amount of the second reaction product (XXX) titanium tetra-normal-butoxide, and triethyl aluminum were 178 mg, 0.233 millimole, and 4.73 millimoles, respectively. The results are given in Table 7.

EXAMPLE 44

The polymerization of ethylene in Example 42 was repeated except that the used amounts of the second reaction products (XXX), titanium tetra-normal-butoxide, and triethyl aluminum were 203 mg, 0.31 millimole, and 3.88 millimoles, respectively. The results are given in Table 7.

Comparative example 6

The polymerization of ethylene in Example 42 was repeated except that the used amounts of the second reaction product (XXX), titanium tetra-normal-butoxide, and triethyl aluminum were 189 mg, 0 millimole, and 3.89 millimoles, respectively. The results are given in Table 7.

As clearly seen in Table 7, both the bulk density and the rate of formation are remarkably improved in the polymers of Example 42 – 44 of this invention, compared with the polymer of the comparative example. Further the values of melt indexes clearly shows that the effectiveness in the reduction of molecular weight is very great.

In addition, the large branching of the polymer of this invention suggests that the resistance to stress cracking is improved.

EXAMPLE 45

The polymerization reaction of Example 42 was repeated except that the used amounts of the second reaction product (XXX), titanium tetra-normal-butoxide, and triethyl aluminum were 155 mg, 0.10 millimole, and 2.9 millimoles, respectively, and that hydrogen was introduced at a gauge pressure of 1 kg/cm$^2$ and ethylene was introduced so that the polymerization pressure in gauge became 5 kg/cm$^2$ (hydrogen content in the total gas: 20%).

The resulting polymer was finely divided powder. The results are given in Table 8.

EXAMPLE 46

The polymerization of Example 42 was repeated except that the used amounts of the second reaction product (XXX), titanium tetra-normal-butoxide, and triethyl aluminum were 158 mg, 0.10 millimole, and 3.0 millimoles, respectively, and that hydrogen was introduced at a gauge pressure of 3 kg/cm$^2$ and ethylene was introduced so that the polymerization pressure in gauge became 5 kg/cm$^2$ (hydrogen content in the total gas: 60%). The results are given in Table 8.

Comparative example 7

The polymerization of ethylene in Example 42 was repeated except that the used amounts of the second reaction product, titanium tetra-normal-butoxide, and triethyl aluminum were 152 mg, 0.11 millimole, and 2.9 millimoles, respectively, and that hydrogen was introduced at a gauge pressure of 0.5 kg/cm$^2$ and ethylene was introduced so that the polymerization pressure in gauge became 5 kg/cm$^2$ (hydrogen content in the total gas: 10%). The results are given in Table 8.

Comparative example 8

The polymerization of ethylene in Example 42 was repeated except that the used amounts of the second reaction product (XXX), titanium tetra-normal-butoxide, and triethyl aluminum were 156 mg, 0.10 millimole, and 2.8 millimoles, respectively, and that hydro- Table 7

| Examples | Second reaction product (XXX) | Titanium tetra-n-butoxide | Triethyl aluminum | Polymer | | | |
|---|---|---|---|---|---|---|---|
| | | | | Bulk density | Rate of formation | MI* | Degree of branching** |
| | | millimole | millimole | | | | |
| 42 | 195mg | 0.112 | 3.77 | 0.308 | 355 | 2.0 | 5.59 |
| 43 | 178 | 0.233 | 4.73 | 0.294 | 344 | 2.2 | 5.25 |
| 44 | 203 | 0.310 | 3.88 | 0.245 | 285 | 14.0 | 19.0 |
| Comparative example | | | | | | | |
| 6 | 189 | — | 3.89 | 0.185 | 198 | 0.24 | 0.50 |

*Measured at 190°C
**Number of methyl in side-chain per 1000 carbon atoms. (Calculated as ethyl branches.)

gen was introduced at a guage pressure of 4.5 kg/cm² and ethylene was introduced so that the polymerization pressure in gauge became 5 kg/cm² (hydrogen content in the total gas: 90%). The results are given in Table 8.

For the purpose of comparison of the quantitative effect of hydrogen, the results of Example 42 are given again in Table 8.

washed, filtered, and dried to obtain 14.5 g of finely divided white polymer.

The resulting polymer had a bulk density of 0.294.

Comparative example 9

The polymerization of ethylene was repeated in a similar manner as in Example 47 except that the used amounts of the second reaction product (XXXI), tita- Table 8

| Example | Second reaction product (XXX) | Titanium tetra-n-butoxide | Triethyl aluminum | Polymer Hydrogen content | Bulk density | Rate of formation | MI |
|---|---|---|---|---|---|---|---|
| | mg | milli-mole | milli-mole | % | | | |
| Comparative example 7 | 152 | 0.11 | 2.9 | 10 | 0.146 | 455 | unmeasurable |
| Example | | | | | | | |
| 45 | 155 | 0.10 | 2.9 | 20 | 0.269 | 413 | 0.01 |
| 42 | 195 | 0.11 | 3.77 | 40 | 0.303 | 355 | 2.0 |
| 46 | 158 | 0.10 | 3.0 | 60 | 0.294 | 211 | 12.0 |
| Comparative example 8 | 156 | 0.10 | 2.8 | 90 | 0.189 | 28 | 35.4 |

EXAMPLE 47

Manganous chloride tetrahydrate (MnCl$_2$. 4H$_2$O) (5.0 g) and anhydrous aluminum chloride (13.2 g) were mixed and ground. The reaction was carried out by heating the mixture under nitrogen stream at 200°C for 24 hrs. After the completion of the reaction, the reaction mixture was cooled under nitrogen stream, and pulverized to obtain the first reaction product.

The above first reaction product (6.5 g) was suspended into 15 ml of xylene, and 2 ml of titanium tetrachloride was added. The mixture was heated at 120°C for 30 minutes. The reaction mixture was then cooled under nitrogen stream, filtered, washed, and dried to obtain the second reaction product (XXXI). This second reaction product (XXXI) contained metallic titanium in an amount of 8 mg/g of the product.

Into a 300 ml pressure glass tube provided with a stirrer and flushed with nitrogen gas in advance, were introduced 150 ml of n-hexane, 46 mg of the above second reaction product (XXXI), 0.05 millimole of titanium tetra-normal-butoxide, and 85 mg of triethyl aluminum. The reaction tube was sealed, and after 250 ml of hydrogen was introduced under pressure, ethylene was introduced under pressure so that the polymerization pressure became 5 kg/cm² (hydrogen content in the total gas: 20%). The polymerization reaction was carried out at 70°C for 1 hour. After the completion of the reaction, the catalyst was deactivated according to the conventional method. The reaction mixture was nium tetra-normal-butoxide, and triethyl aluminum were 48 mg, 0 millimole, and 86 mg, respectively. The results are given in Table 9, together with those of Example 47.

Table 9

| Example | Second reaction product (XXXI) | Titanium tetra-n-butoxide | Triethyl aluminum | Hydrogen content | Polymer Bulk density | Rate of formation | MI |
|---|---|---|---|---|---|---|---|
| | mg | milli-mole | mg | % | | | |
| 47 | 46 | 0.05 | 85 | 20 | 0.294 | 316 | 0.02 |
| Comparative example 9 | 48 | — | 86 | 20 | 0.146 | 160 | unmeasurable |

EXAMPLE 48

Sodium sulfide nonanhydrate (Na$_2$S.9H$_2$O) (5.1 g) and aluminum chloride (11.2 g) were mixed and heated at 120°C for 5 hrs. After cooling, the reaction mixture was pulverized to obtain the first reaction product.

Then, 8.1 g of the first reaction product, 15 ml of xylene, and 4 ml of titanium tetrachloride were mixed and heated at 130°C for 1 hour. The reaction mixture was cooled, filtered, washed, and dried to obtain the second reaction product (XXXII) containing titanium in an amount of 95 mg/g of the product.

The polymerization of ethylene was repeated in a similar manner as in Example 47 except that 138 mg of the above mentioned second reaction product (XXXII) was substituted for 46 mg of the second reaction product (XXXI), and that the used amounts of titanium tetra-normal-butoxide and triethyl aluminum were 0.10 millimole and 91.2 mg, respectively. There was obtained white polymer of fine powder. The resulting polymer had a bulk density of 0.278, a rate of formation of 250 g/g/hr., and a MI of 0.10. For the purpose of comparison, the polymerization was similarly repeated except that titanium tetra-normal-butoxide was not added. The resulting product had a bulk density of 0.178, a rate of formation of 105 g/g/hr., and a MI 0.01.

EXAMPLE 49

Nickel chloride hexahydrate (NiCl$_2$·6H$_2$O) (4.0 g) and anhydrous aluminum chloride (13.3 g) were mixed and ground. The reaction was carried out by heating the mixture at 200°C for 24 hrs. After cooling, the reaction mixture was pulverized to obtain the first reaction product.

The above first reaction product (7.5 g), xylene (15 ml), and titanium tetrachloride (2 ml) were mixed and heated at 130°C for one hour. The mixture was then cooled under nitrogen stream, filtered, washed, dried to obtain the second reaction product (XXXIII) containing titanium in an amount of 3 mg/g of the product.

The polymerization of ethylene was repeated in a similar manner as in Example 47 except that 85 mg of the second reaction product (XXXIII) was substituted for 46 mg of the second reaction product (XXXI), and that the used amount of triethyl aluminum was 46 mg. The resulting white polymer had a bulk density of 0.269, a rate of formation of 210 g/g/hr., and MI of 0.12. For the purpose of comparison, the polymerization of ethylene was carried out similarly except that titanium tetra-normal-butoxide was not added. The resulting product had a bulk density of 0.169, a rate of formation of 98, and a MI of 0.01.

EXAMPLE 50

Chromic hydroxide (Cr(OH)$_3$) (10.0 g) and ferric chloride (18.5 g) were mixed and ground. The mixture was heated under nitrogen stream at 200°C for 24 hrs. After cooling, the reaction mixture was pulverized to obtain the first reaction product.

The above first reaction product (11.8 g), xylene (15 ml), and titanium tetrachloride (2 ml) were mixed and heated at 130°C for 1 hour. The mixture was then treated in a similar manner as in Example 42 to obtain the second reaction product (XXXIV) containing titanium in an amount of 24 mg/g of the product.

The polymerization of ethylene was repeated in a similar manner as in Example 47 except that 98 mg of the second reaction product (XXXIV) was substituted for 46 mg of the second reaction product (XXXI), and that the used amounts of titanium tetra-normal-butoxide and triethyl aluminum were 0.10 millimole and 58 mg, respectively. The resulting white polymer had a bulk density of 0.294, a rate of formation of 180 g/g/hr., and MI of 0.09. For the purpose of comparison, the polymerization was repeated similarly except that titanium tetra-normal-butoxide was not added. The resulting polymer had a bulk density of 0.146, a rate of formation of 75 g/g/hr., and a MI of 0.01.

EXAMPLE 51

Vanadyl sulfate dihydrate (VOSO$_4$·2H$_2$O) (5.0 g) and aluminum chloride (6.6 g) were mixed and ground. The mixture was heated at 200°C for 24 hrs. After cooling, the reaction mixture was pulverized to obtain the first reaction product.

The above first reaction product (4.2 g), xylene (15 ml), and titanium tetrachloride (2 ml) were mixed and heated at 130°C for 1 hour. The reaction mixture was then treated in a similar manner as in Example 42 to obtain the second reaction product (XXXV).

The polymerization of ethylene was repeated in a similar manner as in Example 47 except that 75 mg of the second reaction product (XXXV) was substituted for 46 mg of the second reaction product (XXXI), and that the used amount of titanium tetra-normal-butoxide was 0.10 millimole. The resulting white polymer had a bulk density of 0.245, a rate of formation of 345 g/g/hr., and a MI of 0.10. For the purpose of comparison, the polymerization was repeated similarly except that titanium tetra-normal-butoxide was not added. The resulting polymer had a bulk density of 0.165, a rate of formation of 180 g/g/hr., and a MI of 0.02.

EXAMPLE 52

Stannous chloride dihydrate (SnCl$_2$·2H$_2$O) (14.3 g) and aluminum chloride (13.3 g) were mixed and heated at 120°C for 24 hrs. After cooling, the reaction mixture was pulverized to obtain the first reaction product.

The above first reaction product (16.8 g), xylene (15 ml), and titanium tetrachloride (4 ml) were mixed and heated at 130°C for 1 hour. The mixture was then treated in a similar manner as in Example 42 to obtain the second reaction product (XXXVI).

The polymerization of ethylene was repeated in a similar manner as in Example 47 except that 65 mg of the second reaction product (XXXVI) was substituted for 46 mg of the second reaction product (XXXI), and that the used amount of triethyl aluminum was 75 mg. The resulting white polymer had a bulk density of 0.303, a rate of formation of 158 g/g/hr. For the purpose of comparison, the polymerization was repeated similarly except that titanium tetra-normal-butoxide was not added. The resulting polymer had a bulk density of 0.200 and a rate of formation of 87 g/g/hr.

EXAMPLE 53

The procedure of Example 42 was repeated to obtain the first reaction product, except that the reaction was carried out at 80°C.

The above first reaction product (10 g), xylene (9 ml), and titanium tetrachloride (1 ml) were mixed and heated at 80°C for 1 hour. The reaction mixture was then treated in a similar manner as in Example 42 to obtain the second reaction product (XXXVIII) containing titanium in an amount of 1.2 mg/g of the product.

The polymerization of ethylene was repeated in a similar manner as in Example 42 except that 185 mg of the second reaction product (XXXVIII), was substituted for 195 mg of the second reaction product (XXX), and that the used amounts of titanium tetra-normal-butoxide and triethyl aluminum were 0.1 millimole and 3.8 millimoles, respectively. The resulting polymer had a bulk density of 0.420, and a rate of formation of 450 g/g/hr., and a MI of 0.10. When the resistance to stress cracking was measured according to ASTM D-1693-60T, it was found that it took more than 1,000 hrs. to break 50% of the number of the test pieces, and that the polymer had excellent physical properties. For the purpose of comparison, the polymerization was repeated similarly except that titanium tetra-normal-butoxide was not added, and then the resistance to stress cracking of the resulting polymer was measured. It took 54 hrs. to break 50% of the number of the test pieces. The polymer had a bulk density of 0.303, a rate of formation of 250 g/g/hr., and MI of 0.05, all being inferior to the polymer obtained according to this invention.

EXAMPLE 54

The copolymerization of ethylene and propylene was carried out in a similar manner as in Example 42.

The used amounts of the second reaction product (XXX), titanium tetra-normal-butoxide and triethyl aluminum were 198 mg, 0.2 millimole, and 4.20 millimoles, respectively. Propylene was first polymerized at a gauge pressure of 5 kg/cm$^2$ at 80°C for one hour, prior to the introduction of hydrogen. Unreacted propylene was purged to decrease the pressure to the atmospheric pressure. Excepting this, the procedure of Example 42 was then repeated similarly for the ethylene-propylene copolymerization.

After the completion of the reaction, the mixture was treated by the conventional method to obtain 42.3 g of a white polymer. This copolymer had a bulk density of 0.370, a rate of formation of 107 g/g/hr., and a MI of 4.0.

EXAMPLE 55

Magnesium hydroxide (58.3 g) and aluminum trichloride (88.9 g) were mixed and ground, and heated at 150°C for 8 hours under nitrogen stream. After cooling and pulverizing, a first reaction product was obtained.

The first reaction product (10 g), xylene (15 ml) and titanium tetra-normal-butoxide (2 ml) were mixed, and subjected to a reaction at 130°C for one hour. The reaction mixture was then treated in a similar manner as in Example 42 to obtain the second reaction product (XXXIX) having a titanium content of 9.5 mg/g.

Ethylene was polymerized in a similar manner as in Example 42 except that 125 mg of the second reaction product (XXXIX) was used, and the used amounts of titanium tetra-normal-butoxide and triethylaluminum were 0.42 millimole and 4.2 millimoles, respectively. The resultant polymer had a bulk density of 0.395, a rate of formation of 398 g/g/hr and a MI of 0.21.

This polymer was subjected to the measurement of resistance to stress-cracking according to ASTM D-1693-63T, and the period up to 50% breakage was above 1,200 hrs.

What is claimed is:

1. A method for polymerizing a material selected from the group consisting of (1) an alpha-olefin monomer and (2) a mixture of an alpha-olefin monomer and another olefin monomer in the presence of a polymerization catalyst, said polymerization catalyst being prepared by a process which consists essentially of;

a. reacting one mole of a halogenide of a trivalent metal selected from the group consisting of $AlCl_3$ and $FeCl_3$ together with 0.1 – 2 moles of at least one kind of compound selected from the group consisting of $Na_2S.9H_2O$, $LiOH.H_2O$, $Mg(OH)_2$, $Zn(OH)_2$, $Ca(OH)_2$, $MgCl_2.6H_2O$, $SnCl_2.2H_2O$, $TiCl_3.6H_2O$, $MnCl_2.4H_2O$, $FeCl_2.2H_2O$, $CoCl_2.6H_2O$, $NiCl_2.6H_2O$, $Cr(OH)_3$, $Mn(OH)_2$, $Fe(OH)_3$, $Co(OH)_3$, $Ni(OH)_2.H_2O$, $VOSO_4.2H_2O$, $CoSO_4.7H_2O$ and $FeSO_4.7H_2O$ so as to form a first reaction product having active groups on the surface, b. the reaction of step (a) being carried out at a temperature ranging from 60° to 200°C under an atmospheric or reduced pressure, c. reacting the product resulting from step (a) with a compound of transition metal selected from the group consisting of halides, oxyhalides, alcoholates, alkoxyhalides and acetoxyhalides of titanium, vanadium and chromium, d. the reaction of step (c) being carried out in an inert hydrocarbon solvent e. combining the reaction product of step (c) with an organoaluminum compound selected from the group consisting of trialkylaluminum, alkylaluminum, sesquihalide, dialkylaluminum monohalide, and monoalkylaluminum dihalide at a temperature of about −50°C to about 150°C and under a pressure from the atmospheric pressure to 40 kg/cm$^2$ in an inert hydrocarbon solvent.

2. A method according to claim 1, wherein said compound of transition metal is selected from the group consisting of titanium tetrachloride, vanadium tetrachloride, vanadium oxytrichloride, and chromyl chloride.

3. A method according to claim 1, wherein said organoaluminum compound is selected from the group consisting of triethylaluminum, diethylaluminum monochloride and monoethylaluminum dichloride.

4. A method according to claim 1, wherein said alpha-olefin is selected from the group consisting of ethylene, propylene, butene-1, hexene-1, octene-1, decene-1, 3-methyl-butene-1, 3-methyl-pentene-1, 4-methyl-pentene-1, 5-methyl-hexene-1 and mixture thereof.

5. A method according to claim 1, wherein said polymerizing is carried out in the presence of hydrogen.

6. A method according to claim 1, wherein said polymerizing is carried out in the presence of at least one additive selected from the group consisting of silicone oil, diester of polyethylene glycol and tetraalkoxysilane.

7. A method according to claim 6, wherein ethylene and another olefin selected from the group consisting of propylene, butene-1, 3-methyl-pentene-1, 4-methyl-pentene-1, hexene-1, heptene-1 and styrene are polymerized.

* * * * *